R. HART.
Sheep Rack.
No. 43,023.
Patented June 7, 1864.
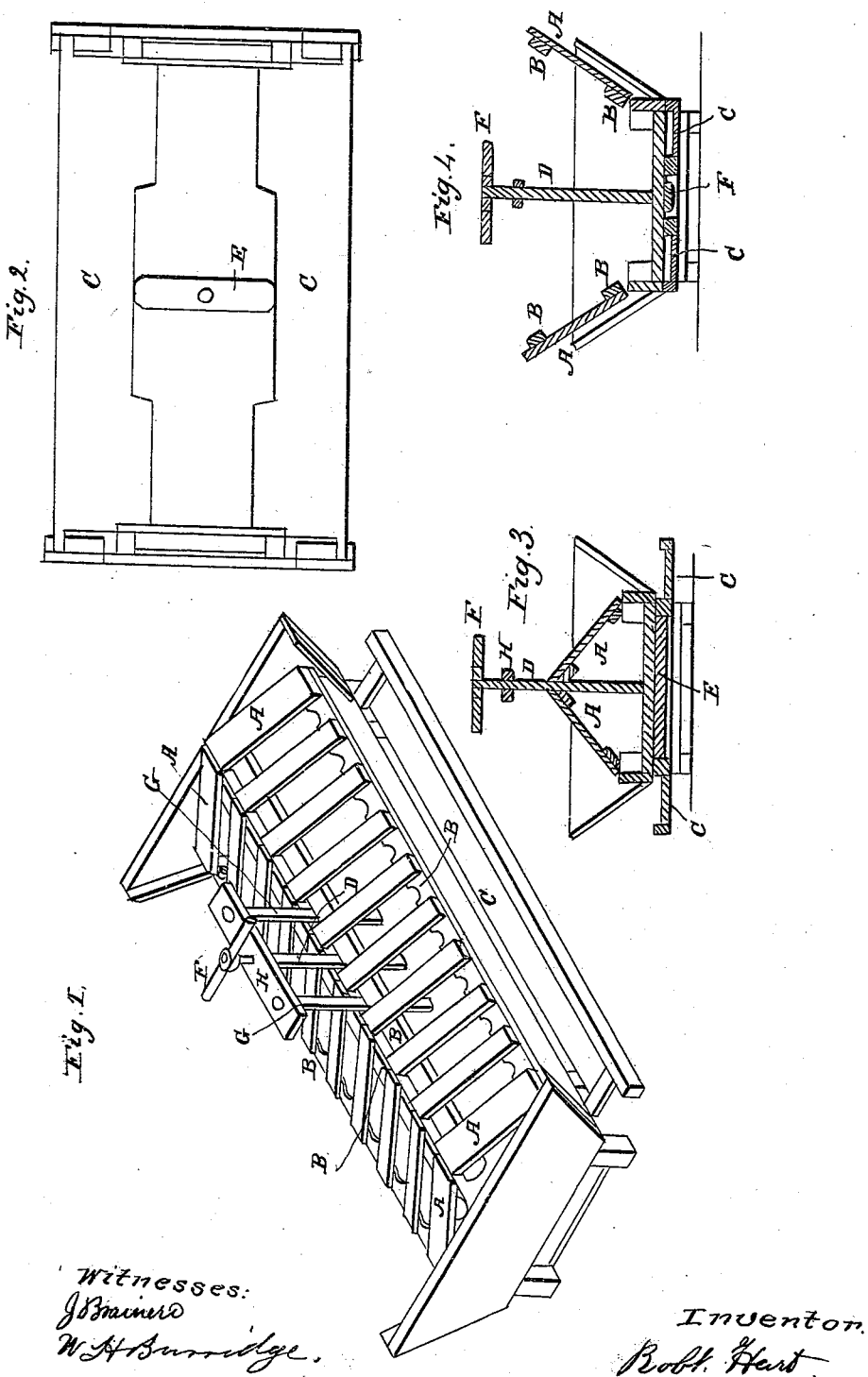
Witnesses:
J Brainerd
W H Burridge
Inventor:
Robt. Hart

UNITED STATES PATENT OFFICE.

R. HART, OF SAVANNA, OHIO.

SHEEP-RACK.

Specification forming part of Letters Patent No. 43,023, dated June 7, 1864.

*To all whom it may concern:*

Be it known that I, R. HART, of Savanna, in the county of Ashland and State of Ohio, have invented new and useful Improvements in Sheep-Racks; and I do hereby declare that the following is a full and complete description of the construction and operation of the same, reference being had to the accompanying drawings, making part of this specification, in which—

Figure 1 is a perspective view. Fig. 2 is a view of the under side, and Figs. 3 and 4 are cross sections.

Like letters refer to like parts.

The nature of my invention relates to a folding rack furnished beneath with adjustable feeding-troughs, which can be shoved out for use at one movement of the hand by means of a cam, and when not needed for use can be returned to their places under the rack.

In Fig. 1, A A represent two hinged racks properly adjusted for the use of the animals. (Shown also in the same position in Fig. 3.) These are composed of a series of slats, which are placed at sufficient distance apart to admit the head of the sheep when feeding, and secured to longitudinal bars B B. They are thrown open, as seen in Fig. 4, to receive the hay, after which they are closed, as seen in Figs. 1 and 3. The animals are thus prevented from wasting the hay while engaged in feeding. Beneath the body of the rack, and upon each side, I place a feed-trough, C, each of which shoves out, and in like a drawer. These drawers are designed for a receptacle of small grain, provender, salt, and like substances for the sheep. They can be charged with their appropriate feed at the same time the hay is placed in the rack and shoved into their places beneath the rack, as seen in Fig. 4, ready for use when needed. For the purpose of moving them out at pleasure when needed, I erect a standard, D, at or near the middle of the rack, which standard passes through the bottom of the rack box, and to the lower end of this standard D, I affix a cam or bar, E. To the upper end of the standard D, I attach a lever, F, by means of which the standard is turned. When the feed-troughs are shoved in, the cam E is in the position shown in Fig. 4, and when it is desired to shove the feed-troughs out by taking hold of the handle or lever F and giving it a quarter-turn, the cam E shoves both troughs out, as seen in Figs. 1, 2, and 3. The standard D is kept in place by the posts G G and cross-bar H. The rack, with its troughs, is mounted upon short legs to give it the proper height for the convenience of the animals, and can be moved from place to place at pleasure.

What I claim as my improvement, and desire to secure by Letters Patent, is—

The herein-described sheep-rack, composed of the hinged sections A B, the troughs C C, standard D, and cam E, when these several parts are constructed, arranged, and combined in the manner and for the purpose herein set forth.

R. HART.

Witnesses:
NATHANIEL PITTENGER,
LAURA M. SHRIVER.